US006714237B2

(12) United States Patent
Lee et al.

(10) Patent No.: US 6,714,237 B2
(45) Date of Patent: Mar. 30, 2004

(54) APPARATUS AND METHOD FOR AUTOMATICALLY STORING AN INTRUSION SCENE

(75) Inventors: Sang-soo Lee, Daejeon (KR); Jae-won Yoo, 203-704, Expo Apt., Jeonmin-dong Yuseong-gu, Daejeon (KR)

(73) Assignees: Menix Engineering Co., Ltd., Daejeon (KR); Jae-won Yoo, Daejeon (KR)

( * ) Notice: Subject to any disclaimer, the term of this patent is extended or adjusted under 35 U.S.C. 154(b) by 141 days.

(21) Appl. No.: 09/948,726

(22) Filed: Sep. 10, 2001

(65) Prior Publication Data

US 2003/0156030 A1 Aug. 21, 2003

(30) Foreign Application Priority Data

Sep. 9, 2000 (KR) .................................... 2000-25835 U
Sep. 9, 2000 (KR) .................................... P2000-53859

(51) Int. Cl.[7] .................................... H04N 7/18
(52) U.S. Cl. .................................... 348/152; 340/541
(58) Field of Search .................................... 348/152, 153, 348/154, 155; 340/541

(56) References Cited

U.S. PATENT DOCUMENTS 4,249,207 A * 2/1981 Harman et al. ............ 348/143
5,109,278 A * 4/1992 Erickson et al. ............ 348/154
5,289,275 A * 2/1994 Ishii et al. ............ 348/154
6,069,653 A * 5/2000 Hudson ............ 348/143
6,069,655 A * 5/2000 Seeley et al. ............ 348/154
6,081,606 A * 6/2000 Hansen et al. ............ 382/107
6,097,429 A * 8/2000 Seeley et al. ............ 348/154
6,445,409 B1 * 9/2002 Ito et al. ............ 348/155

* cited by examiner

*Primary Examiner*—Thomas Mullen
(74) *Attorney, Agent, or Firm*—Leydig, Voit & Mayer, Ltd.

(57) ABSTRACT

An apparatus and method for automatically storing an intrusion scene, and a method for controlling the apparatus using a wireless signal are provided. According to the apparatus and methods, an image is photographed every time a time interval elapses, converted into digital signals and stored. The stored signals are divided into a number of regions. The signals are sampled within each region, and data is extracted. It is determined whether an intrusion has occurred by comparing the extracted image data with image data extracted immediately before. If it is determined that intrusion occurred, scene data corresponding to the image data in which the intrusion is recognized is stored, and notification that an intrusion has occurred is wirelessly transmitted. Functions for these operations are set by a remote controller using keypads. By doing so, if an intruder intrudes into an area, the unmanned monitoring apparatus provides an intrusion alarm and at the same time photographs the intrusion scene. The scene data is important evidence for arresting the intruder and proving the intrusion. Also, the size of the apparatus can be easily reduced for convenient maintenance.

11 Claims, 10 Drawing Sheets

APPARATUS AND METHOD FOR AUTOMATICALLY STORING AN INTRUSION SCENE

BACKGROUND OF THE INVENTION

1. Field of the Invention

The present invention relates to image recognition and processing, and more particularly, to an apparatus which automatically stores an image if a change in the image is detected, and provides an intrusion alarm, and a method thereof.

2. Description of the Related Art

In a prior art apparatus for storing an image when an abnormal situation occurs, or in a prior art security apparatus, a video camera and an apparatus for storing an image are separately installed and images are continuously stored at predetermined intervals. Sometimes, a plurality of cameras can be connected to an image apparatus. However, tapes or hard discs, as an image storage medium, are used for long-time continuous recording and therefore the apparatus should have a function for storing large-volume data. As a result, the apparatus becomes costly, and still lacks a recognition function which can recognize a scenario, such as an intrusion. In other cases, a security system has an image recognition function in its camera part and no apparatus for storing an image. Thus, a separate storage function unit should be formed and connected to the camera.

That is, in the prior art, in order to recognize intrusion, a plurality of unnecessary images, in addition to an intrusion image, should be stored, or an additional cost for storing images is needed.

SUMMARY OF THE INVENTION

To solve the above problems, it is a first objective of the present invention to provide an apparatus and method for automatically storing only intrusion images in an embedded storage medium and for providing an alarm in the event of an intrusion.

It is a second objective of the present invention to provide a method for setting an operation state of the apparatus by manipulating a minimum number of keypads on a remote controller.

To accomplish the first objective of the present invention, there is provided an apparatus for automatically storing an intrusion scene having a photographing unit for photographing an image every time a predetermined time interval elapses; an A/D converting unit for receiving a signal of an image photographed by the photographing unit and converting the signal into a digital signal; a video signal storage unit for storing the digital signal output from the A/D converting unit; a microprocessor unit for dividing the signal stored in the video signal storage unit into a predetermined number of regions, sampling the signal within each region, extracting image data from the sampling data, and storing the extracted data; a comparison/calculation unit for determining whether or not intrusion occurred, by comparing extracted image data with image data extracted immediately before; and a scene data storage unit for storing scene data that is a digital signal stored in the video signal storage unit and that corresponds to image data in which intrusion is recognized, if the comparison/calculation unit determines that intrusion is recognized.

It is preferable that the apparatus for automatically storing an intrusion scene further includes a notification unit which informs a predetermined destination that intrusion occurred, if intrusion is recognized by the comparison/calculation unit.

It is preferable that the apparatus for automatically storing an intrusion scene further includes a real-time clock for outputting data indicating current time, in which when the scene data in which intrusion is recognized is stored, the scene data storage unit inserts the current time data of the real-time clock into the scene data in which intrusion is recognized.

It is preferable that the apparatus for automatically storing an intrusion scene of claim 1, further includes a D/A converting unit for converting a digital signal stored in the video signal storage unit and outputting an analog image signal.

Also, to accomplish the first objective of the present invention, there is provided a method for automatically storing an intrusion scene, having the steps of (a) photographing an image every time a predetermined time interval elapses, converting each image into a digital signal, and storing the signals; (b) dividing the stored signals into a predetermined number of regions; (c) sampling the signals within each region, extracting image data from sampled data, and storing the extracted data; (d) determining whether or not intrusion occurred by comparing image data extracted in step (c) with image data extracted immediately before; (e) storing scene data that is a digital signal stored in step (a) corresponding to image data in which intrusion is recognized, if it is determined that intrusion occurred.

It is preferable that the automatic storing method for an intrusion scene further includes the step of accessing and displaying intrusion data stored in step (e).

To accomplish the second objective of the present invention, there is provided another method for wirelessly controlling an apparatus for automatically storing an intrusion scene. In controlling an image monitoring apparatus using a wireless signal generated a combination of keys of a remote controller are pushed. An image monitoring apparatus operates a video camera, and sends images to an image display means. Intrusion scenes are automatically stored if an intrusion is recognized. A current scene may be manually stored. Already stored scenes can be checked and deleted, the time of an embedded clock may be set, and a time interval for automatically storing scenes can be set. The method for wirelessly controlling an apparatus for automatically storing an intrusion scene includes (a) displaying a function-setting menu on the image display means if a first key and a second key are simultaneously pushed; (b) advancing through a plurality of screens, in each of which a different function can be made to operate, by pushing a third key to advance one screen; and (c) setting the unique operation of a function corresponding to a screen, by pushing the first key or the second key for each screen of step (b).

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Figure 1:
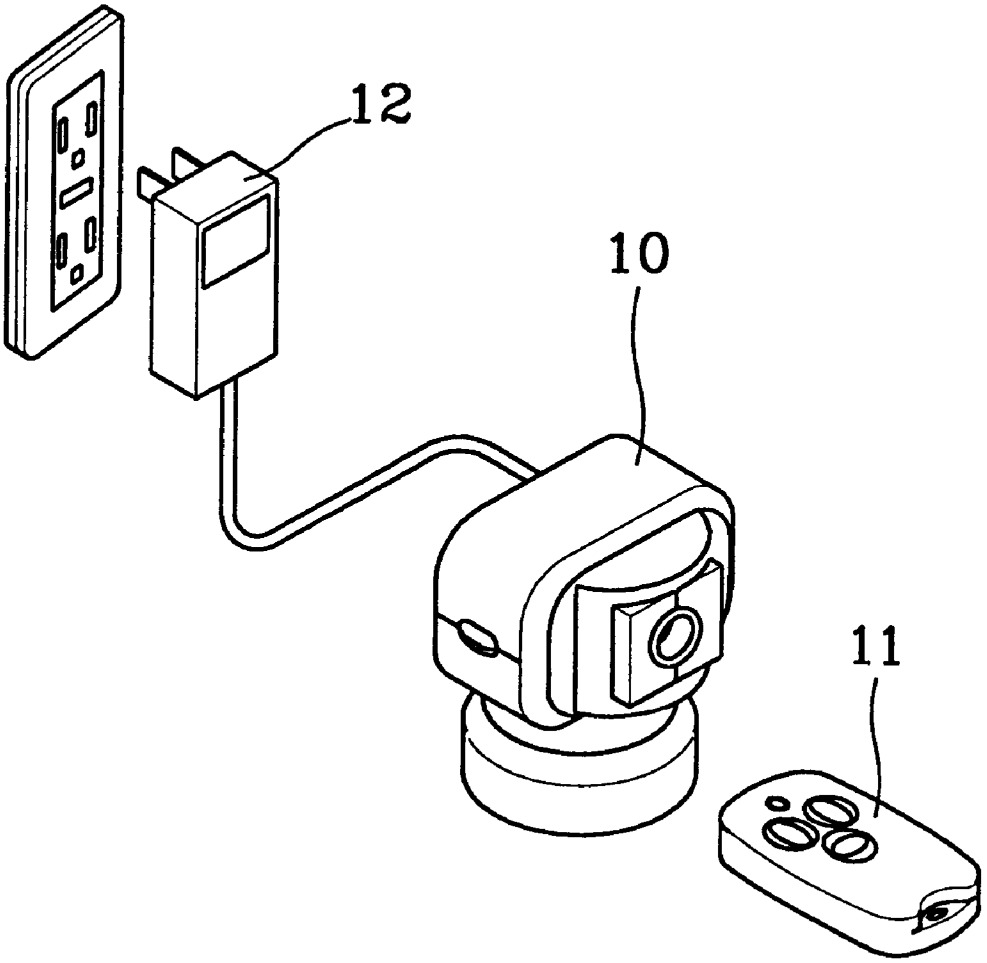
FIG. 1 is a perspective view of an apparatus for automatically storing an intrusion scene according to the present invention and accessories thereof.

FIG. 1 is a perspective view of an apparatus for automatically storing an intrusion scene and providing an intrusion alarm according to the present invention and accessories thereof. The apparatus includes a main body 10, a wireless remote controller 11, and a power adapter 12.

Figure 2:
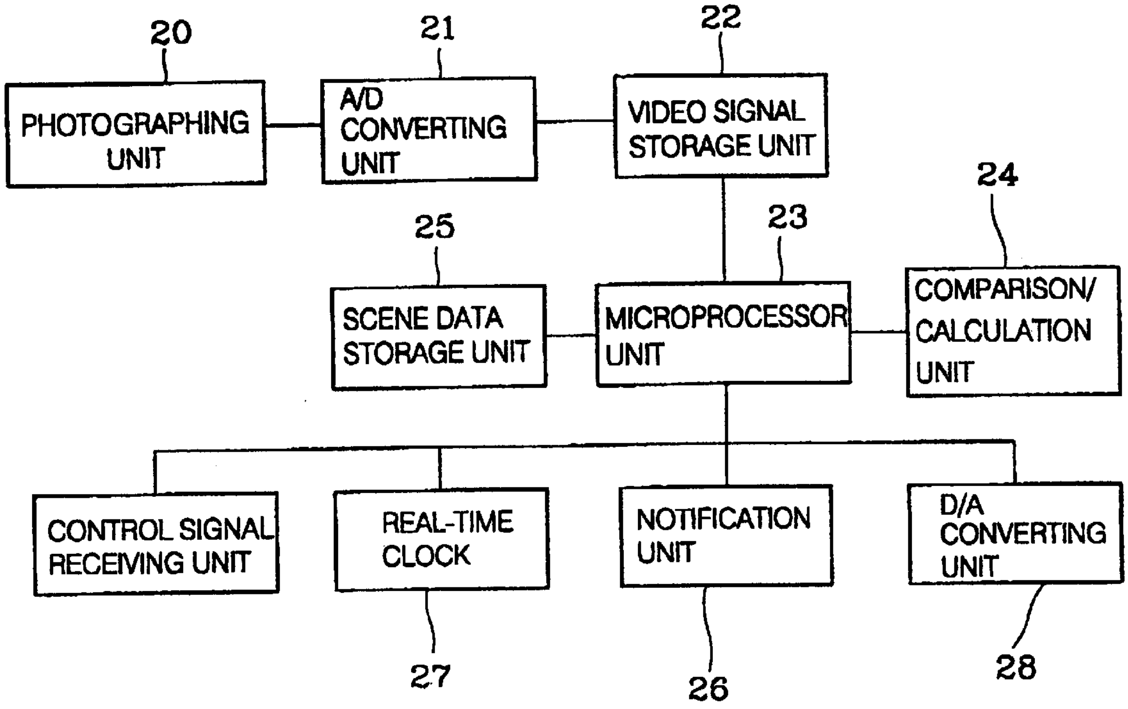
FIG. 2 is a block diagram of the structure of an apparatus for automatically storing an intrusion scene according to the present invention.

FIG. 2 is a block diagram of the structure of an apparatus for automatically storing an intrusion scene according to the present invention. The apparatus includes a photographing unit 20 for photographing an image; an A/D converting unit 21 for converting an analog signal into a digital signal; a video signal storage unit 22 for storing a digital video signal; a microprocessor unit 23 for dividing a signal stored in the video signal storage unit 22 into a predetermined number of regions, sampling the signal within each region, extracting image data from the sampling data, and storing the extracted data; a comparison/calculation unit 24 for determining whether or not an intrusion occurred by comparing extracted image data with image data extracted immediately before; and a scene data storage unit 25 for storing scene data that is a digital signal stored in the video signal storage unit 22 and corresponds to image data in which intrusion is recognized, if intrusion is recognized.

It is preferable that the apparatus includes a notification unit 26 which informs a predetermined destination that intrusion occurred, if intrusion is recognized by the comparison/calculation unit 24.

Also it is preferable that the apparatus include a real-time clock 27 which outputs data indicating current time, and when the scene data in which intrusion is recognized is stored. The scene data storage unit 25 inserts the current time data of the real-time clock 27 into the scene data in which intrusion is recognized.

Preferably, the apparatus includes a D/A converting unit 28 for converting a digital signal stored in the video signal storage unit 22 and outputting an analog image signal.

Figure 3:
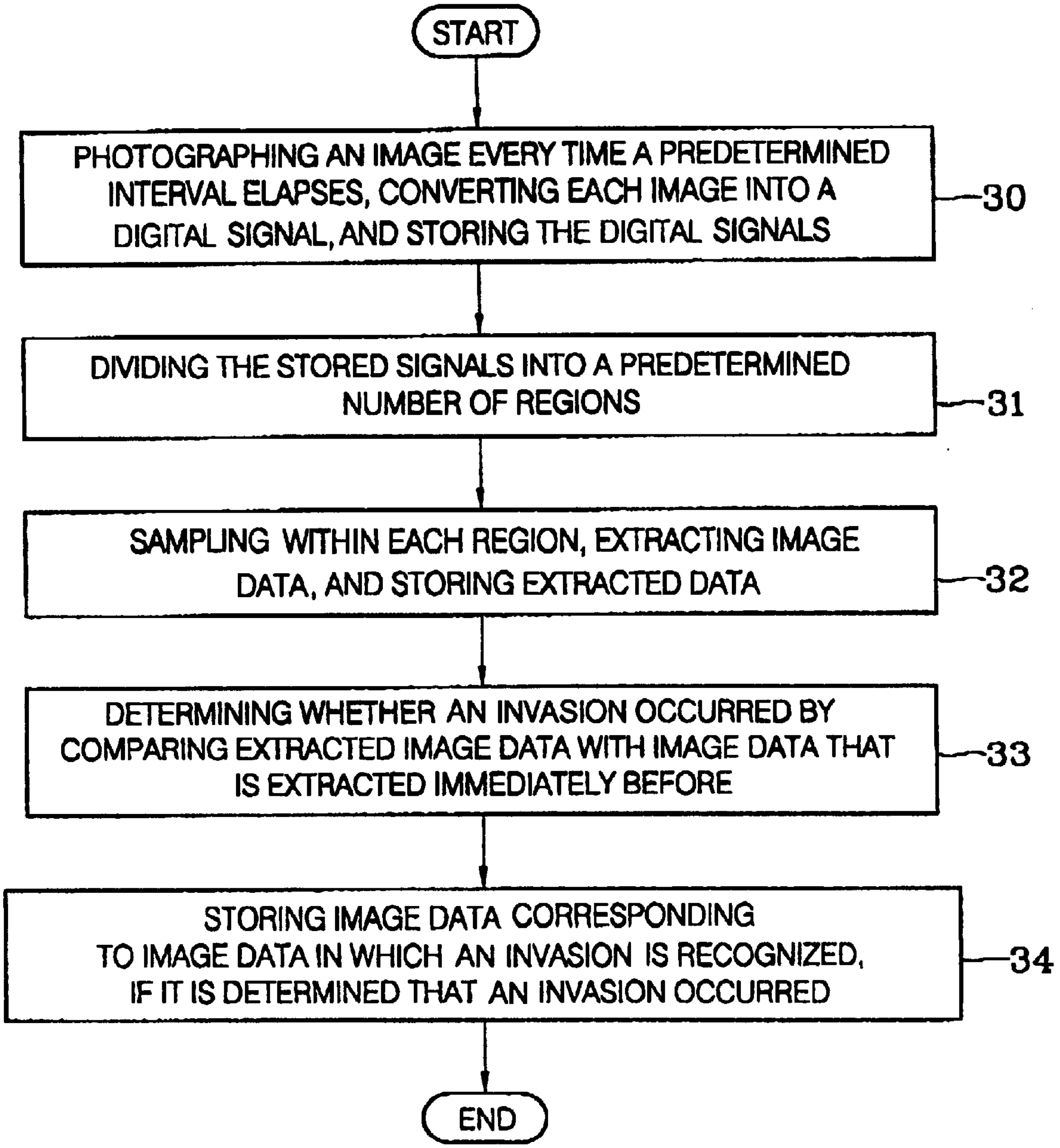
FIG. 3 is a flowchart showing a method for automatically storing an intrusion scene according to the present invention.

FIG. 3 is a flowchart showing a method for automatically storing an intrusion scene according to the present invention. In the method, images are photographed at predetermined intervals, converted into digital signals, and stored in step 30. The stored signals are divided into a predetermined number of regions in step 31. The signals are sampled within each region and data is extracted as image data and the extracted data is stored in step 32. It is determined whether or not intrusion occurred, by comparing the image data extracted in step 32 with image data extracted immediately before, in step 33. If it is determined that intrusion occurred, scene data that is a digital signal stored in step 30 corresponds to the image data in which intrusion is recognized is stored as intrusion data in step 34.

Preferably, at this time, a predetermined destination is alerted of the intrusion in step 35, and an administrator optionally reads the intrusion data stored in step 34.

Referring to FIGS. 2 and 3, a preferred embodiment of the present invention and its operation will now be explained.

An ordinary video camera can be used as the photographing unit 20. By adjusting an interval for photographing a scene, photographing is carried out. For example, if the interval is set to ⅙ second, then a scene is photographed 6 times per second. A photographed image signal is converted into a digital signal in the A/D converting unit 21 and stored in the video signal storage unit 22 in step 30.

The microprocessor unit 23 divides the signal stored in the video signal storage unit 22 into a predetermined number of regions in step 31, converts a signal in each divided region into a sampled signal, extracts image data, and stores the extracted data in step 32.

For example, for an EIA method, a signal is stored as 8-bit signals, each corresponding to a light element of 320 elements in width and 240 elements in length, which is a full screen size of an ordinary video camera. For a CCIR method, a signal is stored as signals, each corresponding to one of 352 elements in width and 288 elements in length. The microprocessor unit 23 divides the width and the length of the screen, respectively by four or three, and generates an 8-bit sampled signal for each region. If the width and length of the screen are divided by four, data in 16 regions are extracted, while if the width and length of the screen is divided by three, data in 9 regions are extracted. The data may be stored in an internal memory of the microprocessor unit 23, or in a separate memory device (not shown).

The comparison/calculation unit 24 determines whether or not intrusion occurs, by comparing image data extracted by the microprocessor unit 23 with image data extracted immediately before, in step 33. The first extracted image data will be compared with the next extracted image data.

If there is no intrusion, the previous image data, the current image data, and the next image data will be all the same. However, if an intruder is photographed, image data extracted from the previous image is different from image data extracted from the current image in which the intruder is photographed, which allows determination of whether or not intrusion occurs.

The maximum interval of photographing in step 30 can be decided considering the widest area the photographing unit 20 can photograph and the moving speed of an ordinary person.

If intrusion is recognized by the operation of the comparison/calculation unit 24, scene data, which is a digital signal stored in the video signal storage unit 22 and corresponds to the image data in which intrusion is recognized, is stored in the scene data storage unit 25 in step 34.

It is preferable that when the scene data in which intrusion is recognized is stored, the scene data storage unit 25 inserts the current time data of the real-time clock 27 into the scene data in which intrusion is recognized. The inserted time shows the intrusion time.

Figure 4:
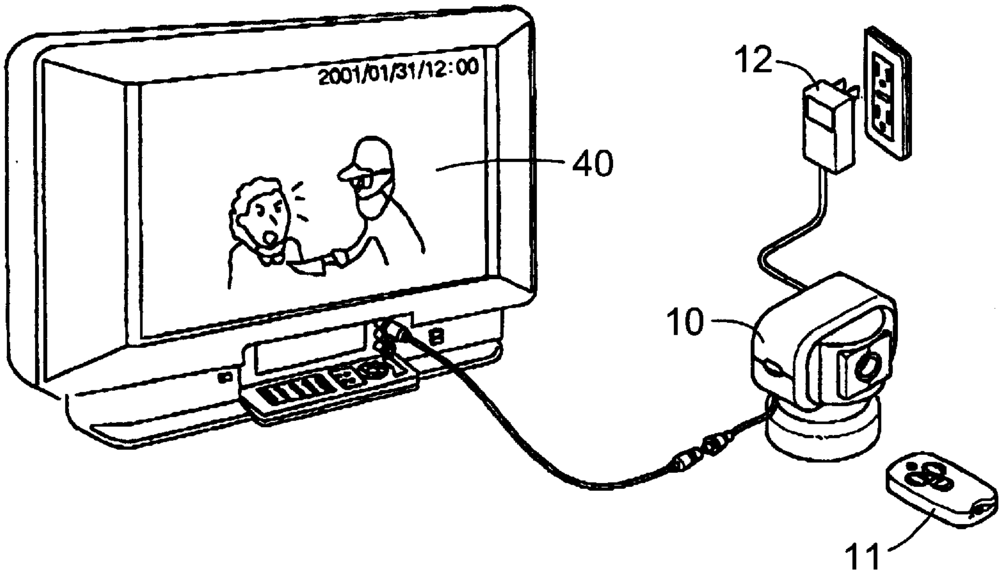
FIG. 4 illustrates a scene of intrusion stored by the apparatus of FIG. 2 and the time of the intrusion measured from when the apparatus of FIG. 2 began to operate, displayed together on a television screen.

FIG. 4 illustrates a scene of intrusion stored by the apparatus of FIG. 2 and the time of the intrusion measured from when the apparatus of FIG. 2 began to operate being displayed together on a television screen. The D/A converting unit 28 outputs image data to the monitor.

If intrusion occurs, the notification unit 26 informs a predetermined destination that intrusion occurred, so as to alert an administrator. It is preferable that the notification unit 26 includes a means for wirelessly sending the intrusion alert to a separate receiving means which is at a predetermined destination. For example, the notification unit 26 may be an RF transmitting circuit.

Figure 5:
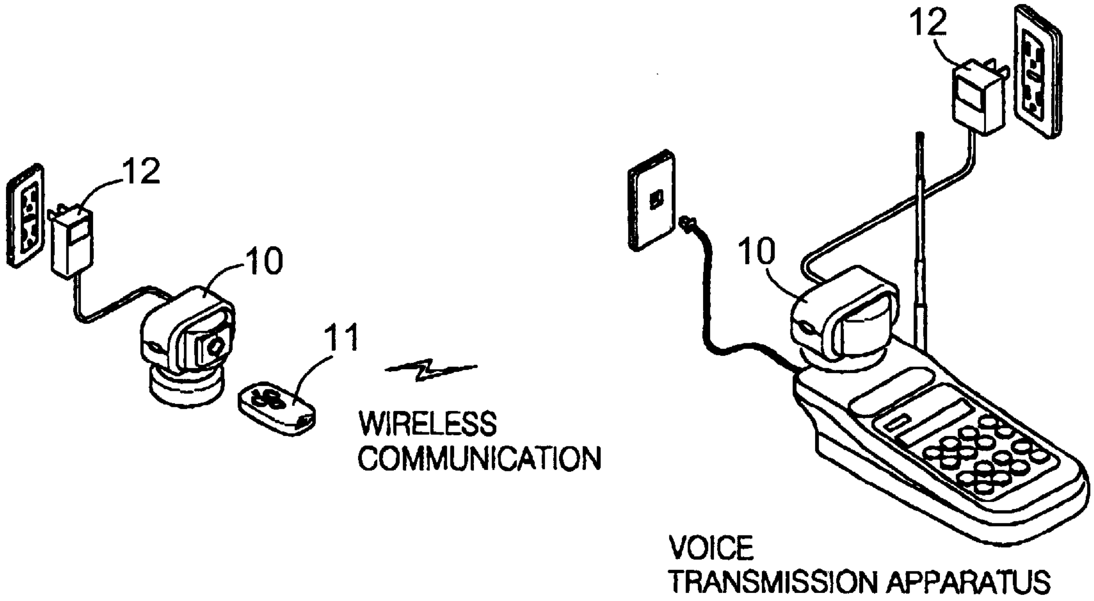
FIG. 5 illustrates the wireless transmission of a notification of intrusion from the apparatus of FIG. 2 to a voice transmission apparatus, when an intrusion occurs.

FIG. 5 illustrates the wireless transmission of a notification of intrusion from the apparatus of FIG. 2 to a voice transmission apparatus, when an intrusion occurs.

In step 33 of FIG. 3, if it is determined that there is no intrusion, step 30 through step 33 are performed again. Only when intrusion occurs, a scene is stored in the scene data storage unit 25. It is preferable that the scene data storage unit 25 includes a flash memory because the scene data storage unit 25 stores only scenes in which intrusion occurred. Unlike an ordinary RAM, the flash memory maintains contents even when power is turned off.

It is preferable that the scene data storage unit 25 has a means so that, if scene data volume to be stored in the scene data storage unit 25 exceeds the capacity of the scene data storage unit 25, the scene which was stored first is deleted and the latest scene is stored in the deleted space. That is, when the scene data storage unit 25 needs to store multiple scenes exceeding the capacity of the scene data storage unit 25, only intrusion scenes having the latest intrusions are stored.

If the capacity of the scene data storage unit 25 is 32 scenes, whenever scene data is stored in the scene data storage unit 25, a counter counts in the increasing direction. If the counter value reaches 32, subsequent scene data is stored starting from the location in the scene data storage unit 25 corresponding to the counter value '1'. Thus, the means for storing latest scene data can be easily implemented.

It is preferable that data stored in the scene data storage unit 25 may be accessed and displayed when necessary. The stored data may be reproduced through the D/A converting unit 28, or deleted by the microprocessor 23.

A control signal receiving unit for receiving control signals to set/release an automatic intrusion detection function, or to check stored scenes, or to control the apparatus, may be included in the apparatus according to the present invention shown in FIG. 2. A control signal may be transmitted wirelessly by a remote controller 11. The control signal receiving unit may be implemented in an RF receiving circuit for receiving a signal from the RF wireless remote controller and sending the signal to the microprocessor unit 23 so as to control the operation of the apparatus.

An image monitoring apparatus according to the present invention of FIG. 2, which has a function for the operations of the video camera, operations for sending images to an image display means, and operations for automatically storing intrusion scenes if intrusion is recognized (hereinafter referred to as a 'monitoring function'), a function for manually storing a current scene, a function for checking already stored scenes, a function for deleting stored scenes, a function for setting the time of an embedded clock, and a function for setting time intervals of automatic storing scenes, may be controlled wirelessly by pushing combinations of keypads on a remote controller.

Figure 6:
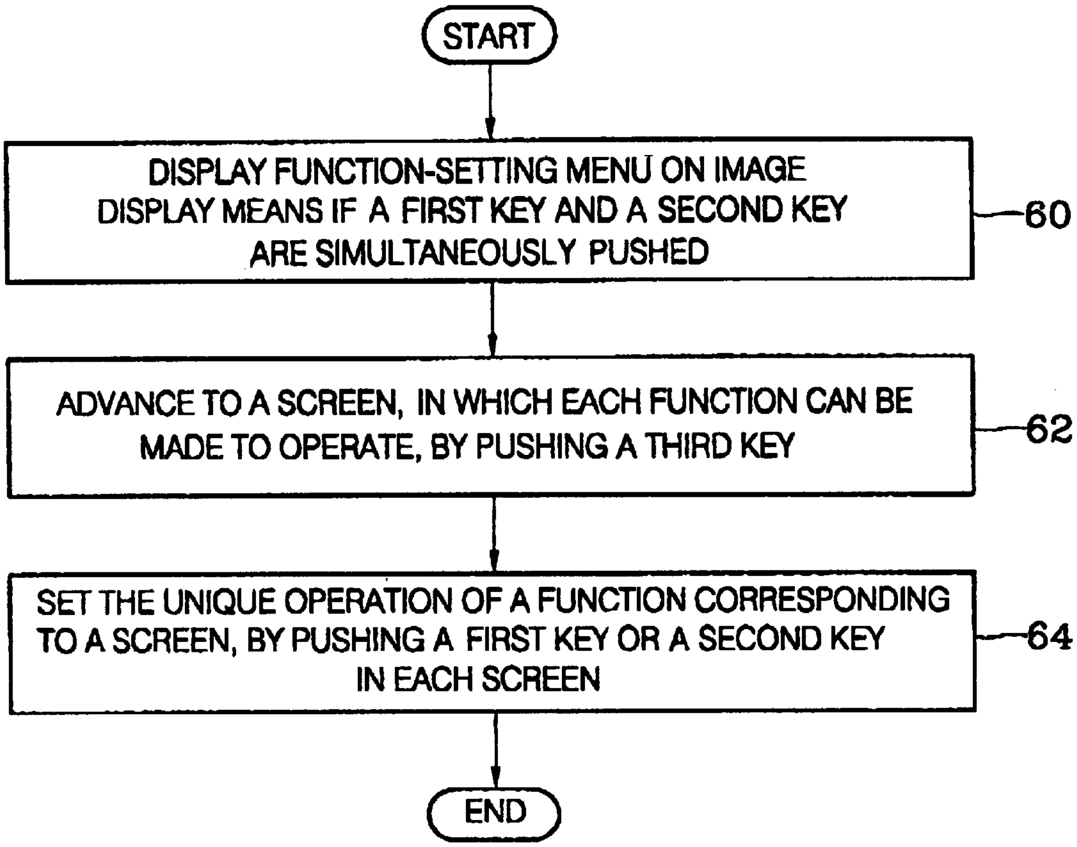
FIG. 6 is a flowchart showing controlling the apparatus of FIG. 2 using a wireless signal generated by a combination of pushed keys of a keypad of a remote controller according to the present invention.

FIG. 6 is a flowchart showing a control method using a wireless signal, in which a wireless signal is generated by a combination of pushed keypads of a remote controller according to the present invention. In this method, if a first keypad and a second keypad are simultaneously pushed, a function-setting menu is displayed on the image display means in step 60. Pushing a third keypad advances the screen to a screen in which each function can be made to operate in step 62. The unique operation of a function corresponding to a screen is set by pushing the first keypad or the second keypad in step 64.

Figure 7:
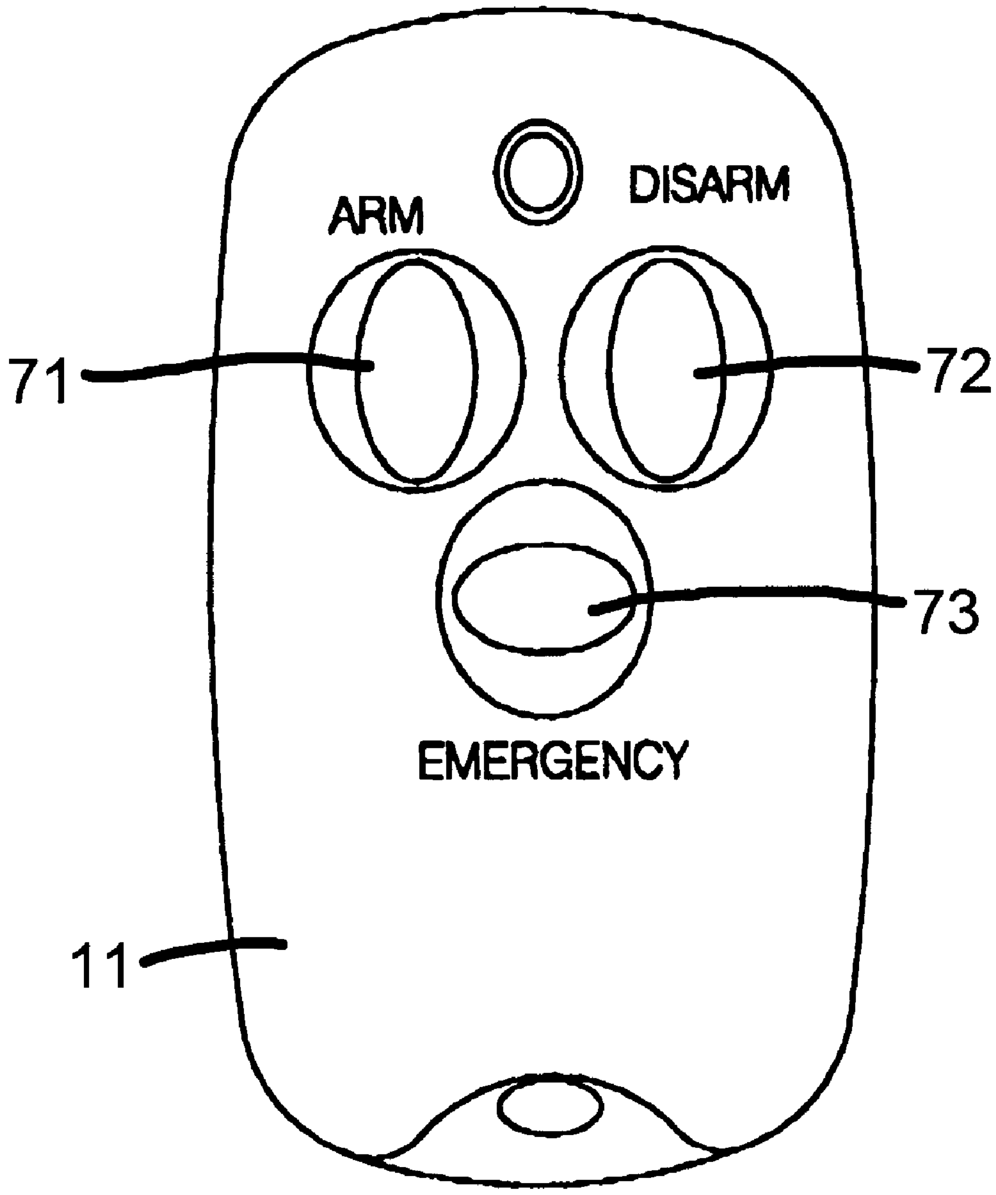
FIG. 7 is a diagram of a wireless remote controller.

FIG. 7 is a diagram of the wireless remote controller 11 shown in FIG. 1. The wireless remote controller 11 has only three keypads, including an arm button 71, a disarm button 72, and an emergency button 73. A method for setting all functions described above by using the three keypads will now be explained in detail.

When the apparatus according to the present invention operates as an ordinary video camera, a monitor is connected to the D/A converting unit 28 so that the apparatus is used as an image monitoring apparatus using the monitor.

In this mode, if the arm button 71 is pushed to arm the apparatus, the apparatus enters into a monitor function mode. If the emergency button 73 is pushed, a function for storing a scene is automatically is performed immediately, and at the same time the apparatus enters into a monitor function mode. If the disarm button 72 is pushed, the apparatus returns to an ordinary video camera mode.

Figure 8:
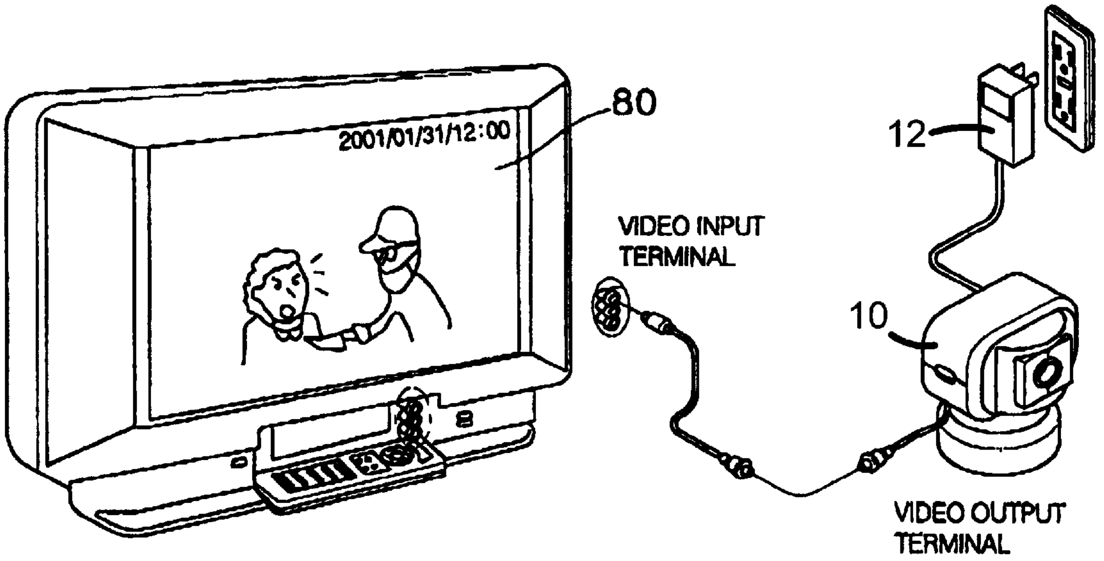
FIG. 8 illustrates a screen in a mode for reproducing a stored scene.

In this state, if the arm button 71 and disarm button 72 are simultaneously pushed, the apparatus enters into a mode for reproducing stored scenes 80. FIG. 8 illustrates a screen in a mode for reproducing stored scenes. Apart from the current scene, by pushing the arm and disarm buttons together, the previous scene and the next scene can be checked.

At this time, the emergency button 73 operates as a next-menu-selection switch so that any operation mode for deleting a stored scene, setting the time, and setting a time interval for storing scenes can be selected.

Figure 9:
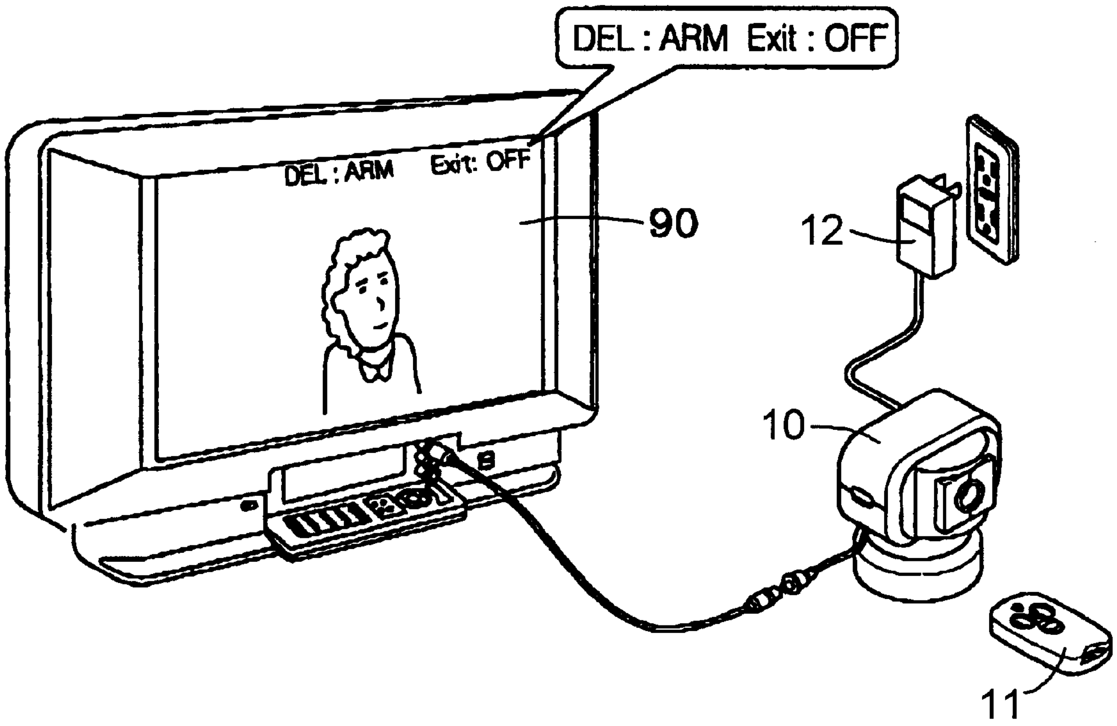
FIG. 9 illustrates a screen in a mode for deleting a stored scene.
Figure 10:
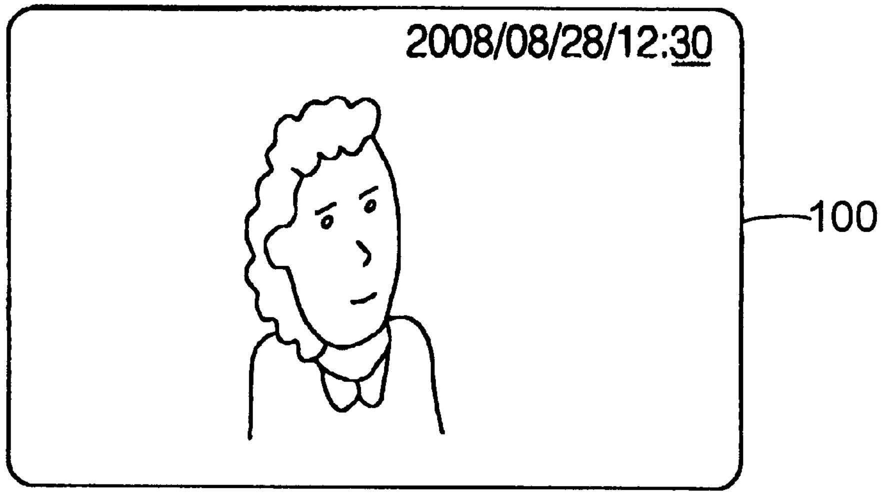
FIG. 10 illustrates a screen in a time-setting mode.
Figure 11:
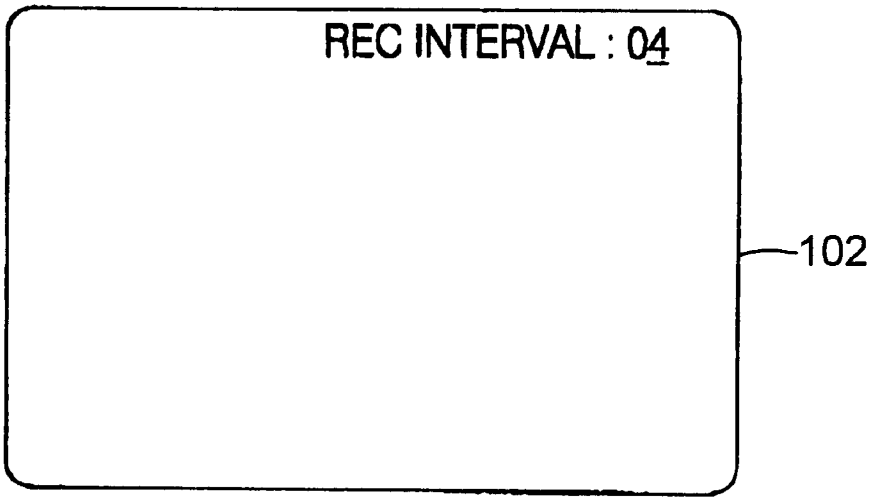
FIG. 11 illustrates a screen in a mode for setting an interval for storing scenes.

If the emergency button 73 is pushed in a mode for reproducing scenes, the apparatus enters into a mode for deleting a stored scene 90. FIG. 9 illustrates a screen in a mode for deleting a stored scene. In this mode, if the arm button 71 is pushed, the scene is deleted, but if the emergency button 73 is pushed, the apparatus enters into a time-setting mode. FIG. 10 illustrates a screen in the time-setting mode. In the time-setting mode, pushing the arm/disarm buttons increases/decreases the number, and pushing the emergency button selects minutes, hours, day, month, and year in turn so that the time and the date can be set. If the emergency button is pushed after setting the year, the apparatus enters into a mode for setting intervals of storing scenes. FIG. 11 illustrates a screen in a mode for setting intervals of storing scenes. After setting time by pushing the arm/disarm buttons together, if the emergency button 73 is pushed, the apparatus returns to an ordinary video camera mode.

Figure 12:
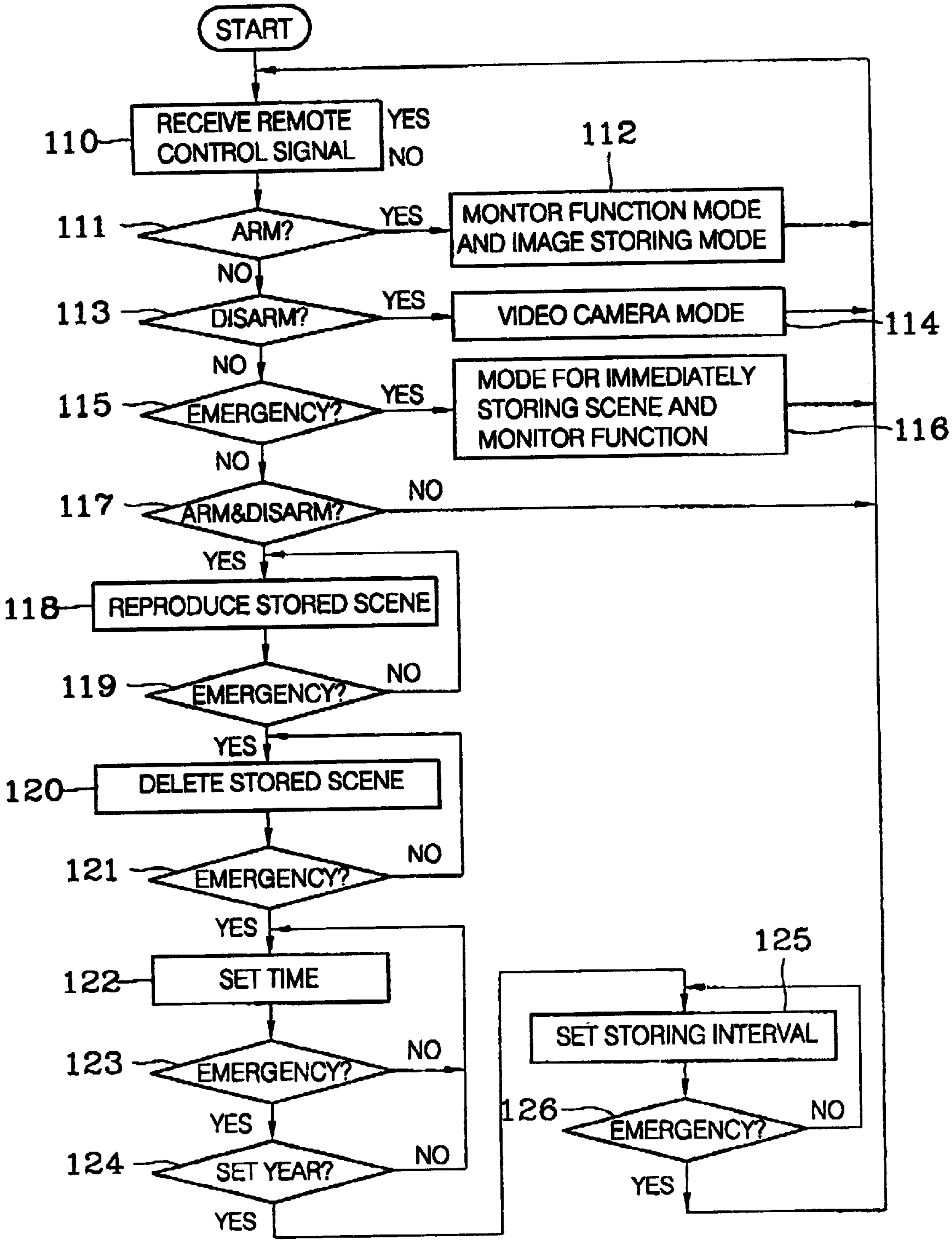
FIG. 12 is a flowchart of a process for controlling the apparatus of FIG. 2, by manipulating keys of a keypad according to the present invention.

All these operations may be performed by the microprocessor unit 23 embedded in the main body of the apparatus. FIG. 12 is a flowchart of a process for controlling the apparatus of FIG. 2 by manipulating 3 keypads according to the present invention. Hereinafter, a state resulting when the arm button of the remote controller is pushed will be referred to as 'arm', a state resulting when the disarm button is pushed as 'disarm', and a state resulting when the emergency button is pushed as 'emergency'.

In an ordinary video camera function mode, if a signal from the remote controller is received, it is determined whether or not the signal is an arm signal in step 111. If it is determined that the signal is an arm signal, the apparatus performs a monitor function and storing function in step 112. If not, it is determined whether or not the signal is a disarm signal in step 113, and if it is determined that the signal is a disarm signal, the apparatus returns to an ordinary video camera function mode in step 114. If not, it is determined whether the signal is an emergency signal in step 115 and if so, the apparatus enters into a mode for immediately storing a scene and monitoring function in step 116. If the arm button and the disarm button are simultaneously pushed in step 117, the apparatus enters into a mode for reproducing a scene in step 118 so that a stored scene can be checked. At this time, if an emergency signal is received in step 119, the apparatus enters into a mode for deleting a scene in step 120. In this mode, if an emergency signal is confirmed in step 121, the apparatus enters into a time-setting mode in step 122. In this mode, every time an emergency signal is again input, the setting scene changes into minutes, hours, etc., in turn, and when year is set, the apparatus enters into a mode for setting an interval for storing scenes in step 125. Also at this time, if an emergency signal is input after an interval for storing scenes is set by pushing the arm and disarm buttons, the apparatus returns to an ordinary video camera mode.

According to the present invention, images are photographed at predetermined intervals, converted into digital signals and stored. The stored signals are divided into a predetermined number of regions. Signals are sampled within each region, data is extracted as image data, and the extracted data is stored. It is determined whether or not intrusion occurred by comparing the extracted image data with image data extracted immediately before. If it is determined that intrusion occurred, scene data corresponding to the image data in which intrusion is recognized is stored, and a notification that intrusion occurred is wirelessly transmitted to a predetermined location. Functions for these operations are set by a remote controller using a minimum number of keypads. By doing so, if an intruder intrudes into an area, the unmanned monitoring apparatus emits an intrusion alarm and at the same time photographs the intrusion scene. The scene data is important evidence for arresting the intruder and proving the intrusion. Also, the size of the apparatus can be easily reduced for convenient maintenance.

What is claimed is:

1. An apparatus for automatically storing an intrusion scene comprising:

a photographing unit for photographing an image every time a time interval elapses;

an analog-to-digital (A/D) converting unit for receiving a signal of an image photographed by the photographing unit and converting the signal into a digital signal;

a video signal storage unit for storing the digital signal output from the A/D converting unit;

a microprocessor unit for dividing the signal stored in the video signal storage unit into a number of regions, sampling the signal within each region, extracting image data from the sampling, and storing the image data extracted;

a comparison/calculation unit for recognizing whether an intrusion has occurred, by comparing the image data extracted with image data extracted previously; and a scene data storage unit for storing scene data, which is a digital signal previously stored in the video signal storage unit and that corresponds to image data in which an intrusion has been recognized by the comparison/calculation unit.

2. The apparatus for automatically storing an intrusion scene of claim 1, further comprising a notification unit which informs a remote location that an intrusion has occurred, if an intrusion has been recognized by the comparison/calculation unit.

3. The apparatus for automatically storing an intrusion scene of claim 1, further comprising a real-time clock for outputting data indicating current time, wherein, when the scene data in which an intrusion is recognized has been stored, the scene data storage unit inserts the current time from the real-time clock into the scene data in which an intrusion has been recognized.

4. The apparatus for automatically storing an intrusion scene of claim 1, wherein the scene data storage unit includes a flash memory.

5. The apparatus for automatically storing an intrusion scene of claim 4, wherein, if scene data volume to be stored in the scene data storage unit overflows the scene data storage unit, the scene which was stored first is deleted and the latest scene is stored.

6. The apparatus for automatically storing an intrusion scene of claim 1, wherein, if scene data volume to be stored in the scene data storage unit overflows the scene data storage unit, the scene which was stored first is deleted and the latest scene is stored.

7. The apparatus for automatically storing an intrusion scene of claim 1, further comprising a notification unit for wirelessly informing a separate receiving apparatus when an intrusion occurs.

8. The apparatus for automatically storing an intrusion scene of claim 1, further comprising a digital-to-analog (D/A) converting unit for converting a digital signal stored in the video signal storage unit and outputting an analog image signal.

9. A method for automatically storing an intrusion scene, comprising:

photographing an image every time an interval elapses, converting each of the images into corresponding digital signals, and storing the digital signals;

dividing the stored signals into a number of regions;

sampling the stored signals within each region, extracting image data from the stored signals sampled, and storing the image data;

determining whether an intrusion has occurred by comparing image data extracted with image data extracted previously; and storing scene data corresponding to image data extracted in which an intrusion is recognized when an intrusion has occurred.

10. The method for automatically storing an intrusion scene of claim 9, further comprising informing a remote location that an intrusion has occurred.

11. The automatic storing method for an intrusion scene of claim 9, further comprising accessing and displaying the scene data stored.

* * * * *